United States Patent
Kim et al.

(10) Patent No.: US 8,366,287 B2
(45) Date of Patent: Feb. 5, 2013

(54) OPTICAL SHEET AND BACKLIGHT UNIT USING THE SAME

(75) Inventors: Jae-Bum Kim, Daegu (KR); Sun-Hwa Lee, Paju-si (KR)

(73) Assignee: LG Display Co., Ltd, Seoul (KR)

( * ) Notice: Subject to any disclaimer, the term of this patent is extended or adjusted under 35 U.S.C. 154(b) by 160 days.

(21) Appl. No.: 12/846,472

(22) Filed: Jul. 29, 2010

(65) Prior Publication Data

US 2011/0032693 A1      Feb. 10, 2011

(30) Foreign Application Priority Data

Aug. 10, 2009   (KR) .................. 10-2009-0073145

(51) Int. Cl.
*G09F 13/04*     (2006.01)
(52) U.S. Cl. .................. 362/97.1; 362/620; 362/626
(58) Field of Classification Search .............. 362/97.1, 362/97.4
See application file for complete search history.

(56) References Cited

U.S. PATENT DOCUMENTS

| | | | |
|---|---|---|---|
| 2007/0195224 A1* | 8/2007 | Chang | 349/65 |
| 2009/0073723 A1* | 3/2009 | Hsu et al. | 362/620 |
| 2009/0161345 A1* | 6/2009 | Hsu et al. | 362/97.2 |

FOREIGN PATENT DOCUMENTS

| | | |
|---|---|---|
| CN | 101025452 A | 8/2007 |
| KR | 1020090010915 A | 1/2009 |

OTHER PUBLICATIONS

Office Action issued in corresponding Chinese Patent Application No. 201010216964.1, mailed Mar. 27, 2012.
Office Action issued in corresponding Korean Patent Application No. 10-2009-0073145, mailed Nov. 19, 2012.

* cited by examiner

*Primary Examiner* — Evan Dzierzynski
(74) *Attorney, Agent, or Firm* — Brinks Hofer Gilson & Lione

(57) ABSTRACT

Disclosed are an optical sheet, which includes a prism pattern having condensing axes crossing each other in diagonal directions with respect to an arrangement direction of light sources, thereby achieving an enhanced contrast ratio without a reduction in viewing angle and an increase in costs, and a backlight unit using the same. The optical sheet includes a plurality of crossed prism patterns each having a first condensing axis and a second condensing axis crossing each other in diagonal directions with respect to an arrangement direction of a light source.

7 Claims, 11 Drawing Sheets

RELATED ART
FIG. 1A

CONDENSING

CONDENSING

OPTICAL SHEET AND BACKLIGHT UNIT USING THE SAME

This application claims the priority and the benefit under 35 U.S.C. §119(a) on Patent Application No. 10-2009-0073145 filed in Republic of Korea on Aug. 10, 2009 the entire contents of which are hereby incorporated by reference.

BACKGROUND

1. Field of the Invention

The present disclosure relates to an optical sheet, and more particularly, to an optical sheet, which includes a prism pattern having condensing axes crossing each other in diagonal directions with respect to an arrangement direction of light sources, thereby achieving an enhanced contrast ratio without a reduction in viewing angle and an increase in costs, and a backlight unit using the same.

2. Discussion of the Related Art

Cathode Ray Tubes (CRTs) are one of generally used display devices and have been mainly used in monitors of televisions, measuring instruments, information terminals, and the like. However, CRTs have problems associated with being both heavy and bulky and thus, could not positively cope with necessities for smaller size and lighter weight of electronics.

Accordingly, CRTs have limits in size, weight, and other characteristics and cannot satisfy demand for ever lighter and smaller electronics. Possible substitutes for CRTs include Liquid Crystal Displays (LCD) using electric-field optical effects, Plasma Display Panels (PDPs) using gas discharge, Electro-Luminescence Displays (ELDs) using electric-field light-emission effects, and the like. Of these substitutes, research on LCDs is actively progressing.

LCDs have several advantages, such as e.g., small size, light weight, and low consumption of electric power, required to substitute for CRTs. Recently, LCDs have been actively developed to sufficiently perform the role of flat panel display devices, and are used in monitors of laptop computers, desktop computers, and other large-scale information display devices. Demand for LCDs is increasing continuously.

Most of such LCDs are light receiving devices that display an image by adjusting the quantity of light introduced from the outside and therefore, have an essential need for a light source, i.e. a backlight unit to irradiate light to an LCD panel.

Generally, a backlight unit, used as a light source of an LCD, is classified into an edge type backlight unit and a direct type backlight unit, based on the arrangement of a cylindrical fluorescent lamp.

Development of a direct type backlight unit began in earnest as LCD sizes increased above 20 inches. In a direct type backlight unit, a plurality of lamps is arranged in a line beneath a diffuser plate to directly irradiate light to a front surface of an LCD panel.

In an edge type backlight unit, a lamp unit is installed at a side surface of a light guide plate that serves to guide light. The lamp unit includes a lamp emitting light, lamp holders coupled to opposite ends of the lamp to protect the lamp, and a lamp reflector surrounding an outer peripheral surface of the lamp, one side of the lamp reflector being fitted to the side surface of the light guide plate so as to reflect the light emitted from the lamp toward the light guide plate.

Both types of the above described backlight units may further include a prism sheet having a condensing function. The prism sheet may be located above a light source or a light guide plate, and serves to condense light emitted from the light source therebelow and transmit the condensed light to a light exit surface.

Hereinafter, a conventional prism sheet will be described with reference to the accompanying drawings.

Figure 1A:
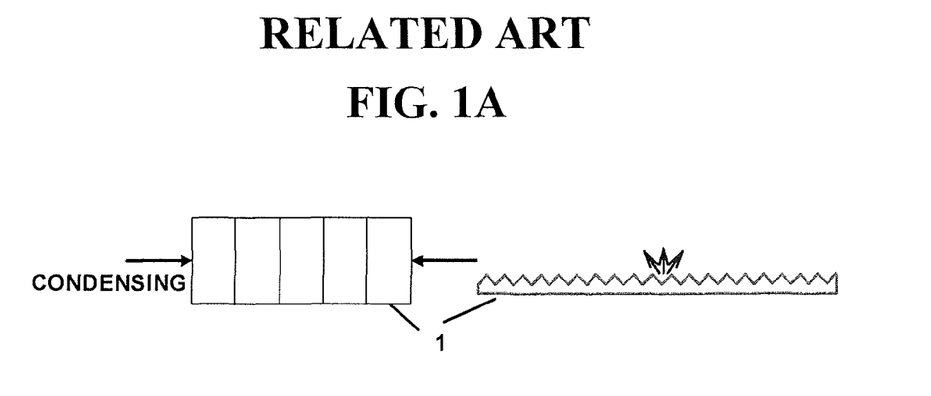
FIGS. 1A and 1B are views illustrating prism sheets respectively having a horizontal condensing axis and a vertical condensing axis.
Figure 1B:
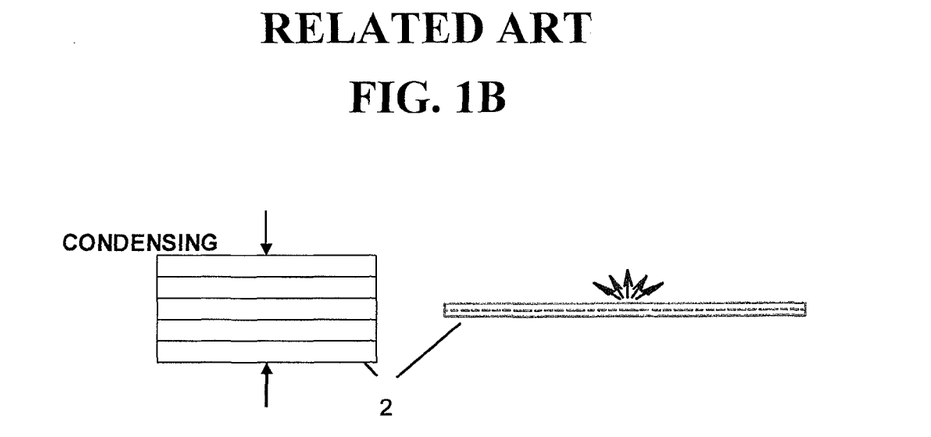

FIGS. 1A and 1B are views illustrating different prism sheets respectively having a horizontal condensing axis and a vertical condensing axis.

FIG. 1A illustrates a prism sheet 1 in which prism peaks are repeated in a horizontal direction, each prism peak extending in a direction penetrating the drawing. In this case, light condensing is performed in such a manner that light emitted from a light source beneath the prism sheet is collected in a horizontal direction.

FIG. 1B illustrates a prism sheet 2 in which prism peaks are repeated in a vertical direction, each prism peak extending in a horizontal direction. In FIG. 1B, the right side drawing is a cross sectional view taken along a direction passing an apex of the horizontally extending prism peak, and a dotted line represents a lowermost point of the prism peak. In this case, light condensing is performed in such a manner that light is collected in a vertical direction.

In the case of the above described prism sheets 1 and 2 in which the prism peaks extend in a given direction as illustrated in FIGS. 1A and 1B, although light condensing is performed in a direction along which the prism peaks are repeated, each prism peak exhibits deterioration in condensing effects in a longitudinal direction thereof. Due to such condensing characteristics in a specific direction, a viewing angle in a vertical direction and a viewing angle in a horizontal direction may have different characteristics.

The above described conventional prism sheets for backlight units have the following problems.

In the conventional prism sheets for backlight units, the prism peaks are arranged parallel to one another to have directivity in a specific direction, thus achieving high condensing effects in a given direction, but having poor condensing efficiency in another direction. This causes a difference in characteristics between a viewing angle in a horizontal direction and a viewing angle in a vertical direction.

To solve the above described problem, there has been attempted a method in which optical sheets are arranged in such a manner that a prism sheet having vertical directivity and a prism sheet having horizontal directivity cross each other, thus removing a difference in characteristic between a viewing angle in a horizontal direction and a viewing angle in a vertical direction. However, this method problematically increases a thickness and manufacturing costs of the resulting backlight unit.

Moreover, simply arranging the prism sheets to cross each other fails to improve the vertical and horizontal viewing angles up to an intended level, and providing a plurality of optical sheets causes a higher cost burden than an acquired efficiency. In addition, defects, such as stripes, etc., may occur at intersections of the prism peaks.

BRIEF SUMMARY

An optical sheet includes a plurality of crossed prism patterns each having a first condensing axis and a second condensing axis crossing each other in diagonal directions with respect to an arrangement direction of a light source.

In accordance with another, a backlight unit includes a plurality of light sources arranged in a given direction, an optical sheet located above the light sources and including a plurality of crossed prism patterns each having a first condensing axis and a second condensing axis crossing each other in diagonal directions with respect to the arrangement direction of the light sources, and a case structure configured to surround the light sources.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE DRAWINGS AND THE PRESENTLY PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an optical sheet and a backlight unit using the same will be described in detail with reference to the accompanying drawings.

Figure 2:
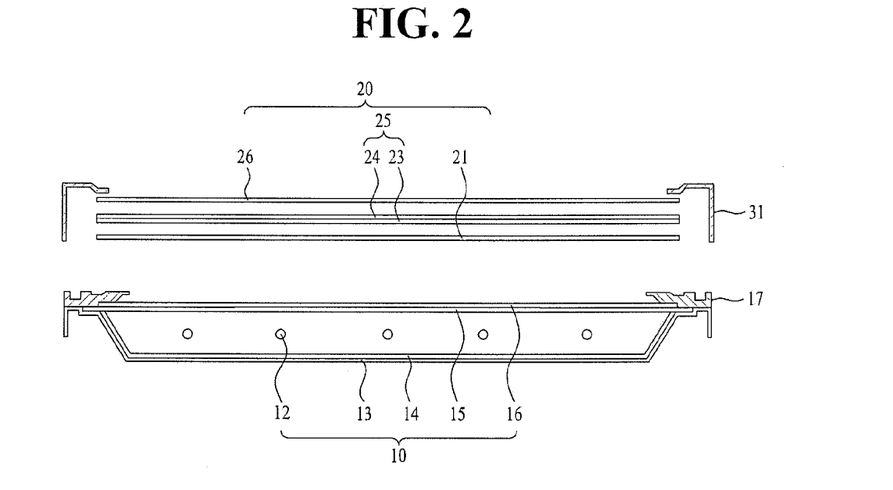
FIG. 2 is a sectional view illustrating a backlight unit according to an embodiment of the present invention.

FIG. 2 is a sectional view illustrating a backlight unit according to an embodiment of the present invention.

As illustrated in FIG. 2, the backlight unit 10 of the present invention is located beneath, e.g., a liquid crystal panel, and serves as a light source. In this case, a liquid crystal display includes the backlight unit 10, a panel guide 17, a liquid crystal panel 20, and a case 31.

The backlight unit 10 includes a plurality of lamps 12, a cover 13 in which the plurality of lamps 12 is received, a diffuser plate 15 placed on a front surface of the cover 13 so as to be opposite the plurality of lamps 12, and at least one optical sheet 16 including a prism sheet (that will be described hereinafter with reference to FIG. 3) placed on the diffuser plate 15, the prism sheet having a condensing axis extending in a diagonal direction with respect to an arrangement direction of the plurality of lamps 12.

Each of the lamps 12 is detachably mounted in a not shown socket and is arranged to be opposite the liquid crystal panel 20. Here, each lamp 12 may be a cylindrical lamp, such as a Cold Cathode Fluorescent Lamp (CCFL), Hot Cathode Fluorescent Lamp (HCFL), External Electrode Fluorescent Lamp (EEFL), or the like. The plurality of lamps 12 is turned on by a lamp drive voltage supplied from the respective sockets, thereby irradiating light to the liquid crystal panel 20. As occasion demands, the lamps 12 may be replaced with Light Emitting Diodes (LEDs).

The cover 13 is fabricated to have a bottom surface opposite the plurality of lamps 12, an inclined surface having a predetermined inclination and extending from the bottom surface to correspond to a longitudinal direction of the lamps 12, and a seating portion extending from the inclined surface so as to be opposite the bottom surface. The bottom surface and inclined surface of the cover 13 are provided with a reflector sheet 14 to reflect light from the respective lamps 12 toward the liquid crystal panel 20.

The diffuser plate 15 is stacked over an opening perforated in the front surface of the cover 13. Specifically, the diffuser plate 15 is seated on an upper surface of the seating portion of the cover 13. The diffuser plate 15 diffuses light irradiated from the plurality of lamps 12 throughout the liquid crystal panel 20.

The at least one optical sheet 16, more particularly, a plurality of optical sheets 16 allows the light diffused by the diffuser plate 15 to be directed perpendicular to the liquid crystal panel 20. To this end, the plurality of optical sheets 16 includes a crossed prism sheet having condensing axes in diagonal directions with respect to the arrangement direction of the lamps 12, to condense the light diffused by the diffuser plate 15.

Although not shown in the drawings, the backlight unit 10 further includes a plurality of inverters to generate a lamp drive voltage, a plurality of wires to supply the lamp drive voltage from the respective inverters to the respective sockets, etc.

In the meantime, the panel guide 17 is mounted on the seating portion of the cover 13 to surround edges and side surfaces of the diffuser plate 16, the plurality of optical sheets 16 and the cover 13. The panel guide 17 includes a panel supporting portion to support the liquid crystal panel 20. The panel supporting portion is stepped to support a non-display area of a rear surface and a side surface of the liquid crystal panel 20.

The liquid crystal panel 20 is stacked on the panel supporting portion of the panel guide 17 and serves to display an image by reflecting light directed from the front side thereof, or by adjusting transmittance of light directed from the backlight unit 10.

More specifically, the liquid crystal panel 20 illustrated in FIG. 2 includes lower and upper substrates 23 and 24, an upper polarizer sheet 26 placed at a front side of the upper substrate 24 to polarize light directed from the front side or light directed through the lower and upper plates 23 and 24 from the rear side, and a lower polarizer sheet 21 provided at a rear side of the lower substrate 23 to polarize light from the backlight unit 10.

The case 31 is bent to surround a non-display area of a front surface of the liquid crystal panel 20 and the side surface of the cover 13. In this case, the case 31 is fastened and fixed to the panel guide 17 surrounding the side surface of the cover 13.

While the above described backlight unit located in a lower region of the liquid crystal display is a direct type backlight unit, as occasion demands, an edge type backlight unit may be provided. In any case, the backlight unit of the present invention includes, as an optical sheet located above light sources, a prism sheet having condensing axes crossing each other in diagonal directions with respect to the arrangement direction of the light sources.

Hereinafter, a detailed configuration of an optical sheet will be described.

Figure 3:
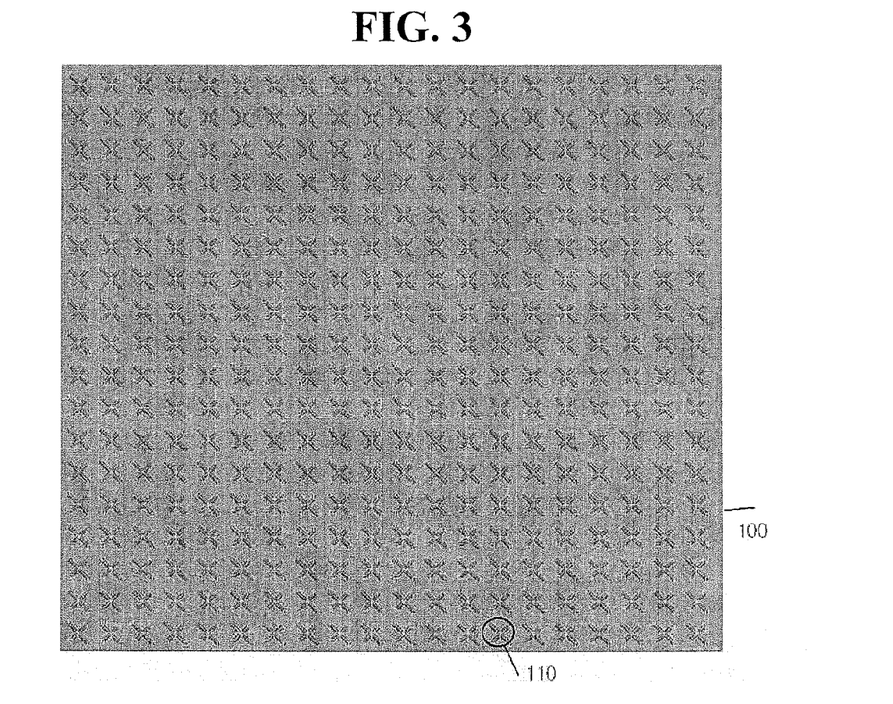
FIG. 3 is a plan view illustrating an optical sheet according to an embodiment of the present invention.
Figure 4:
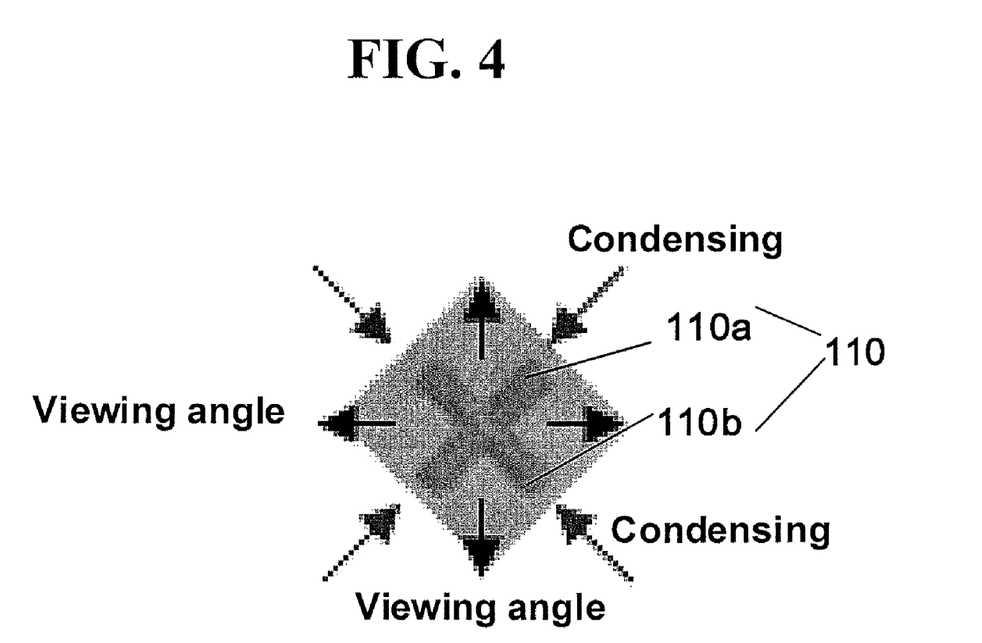
FIG. 4 is a view illustrating a relationship between a condensing direction and a viewing angle in a prism pattern of the optical sheet illustrated in FIG. 3.

FIG. 3 is a plan view illustrating an optical sheet according to the present invention, and FIG. 4 is a view illustrating a relationship between a condensing direction and a viewing angle in a prism pattern of the optical sheet.

As illustrated in FIGS. 3 and 4, the optical sheet 100 according to an embodiment of the present invention is configured in such a manner that a plurality of prism patterns 110 having the same shape and size is systematically arranged to have the same pitch. Each prism pattern 110 takes the form of a combination of a first axis pattern 110a and a second axis pattern 110b crossing each other in diagonal directions with respect to the arrangement direction (horizontal direction of the lamps.

To fabricate the optical sheet 100 of the present invention, after a liquid-phase ultraviolet curable resin is sprayed and coated on a transparent base film (not shown), a roll, on which a negative pattern of the prism pattern is engraved, is rotated on the coated resin to print the prism pattern on the coated resin. Then, as an ultraviolet lamp irradiates light to the prism pattern, the prism pattern is cured on the base film. Instead of this printing roll method, the prism pattern may be formed by a stamping method, in which a stamper, on a surface of which a negative pattern of the prism pattern is provided, is prepared, and after a liquid-phase ultraviolet curable resin is applied to a base film, the applied resin is pressurized, completing formation of the prism pattern, or by a molding method in which a liquid-phase transparent plastic resin is poured into a previously prepared mold to form the prism pattern.

The optical sheet 100 of the present invention has two condensing axes to achieve balanced condensing effects in both vertical and horizontal directions. In particular, by setting the condensing axes in the ranges of 45°±10° and 135°±10° with respect to the arrangement direction of the lamps, the crossed prism pattern performing diagonal condensing is provided, resulting in an enhanced contrast ratio. In addition, condensing efficiency increases toward the center rather than being biased in a vertical direction or a horizontal direction, whereby uniform viewing angle characteristics can be maintained in both vertical and horizontal directions.

Provision of a single prism sheet having a prism pattern in diagonal directions can reduce sheet costs to half that of two conventional prism sheets having condensing axes in different directions, and also, can remove problems of the prism sheets having condensing axes in the different directions (e.g., stripes at intersections of condensing axes).

Moreover, enhanced condensing efficiency can alleviate light leakage caused around the LCD panel 20.

Figure 5A:
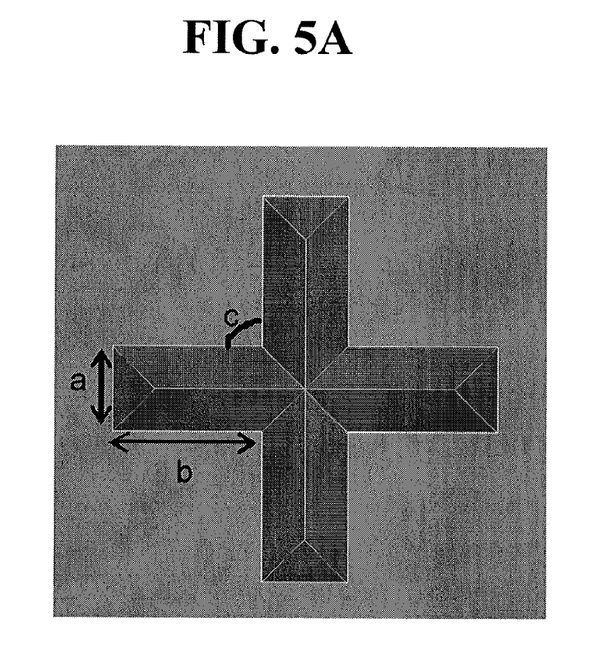
FIGS. 5A and 5B are respectively a plan view and a perspective view illustrating the prism pattern of the optical sheet according to an embodiment of the present invention.
Figure 5B:
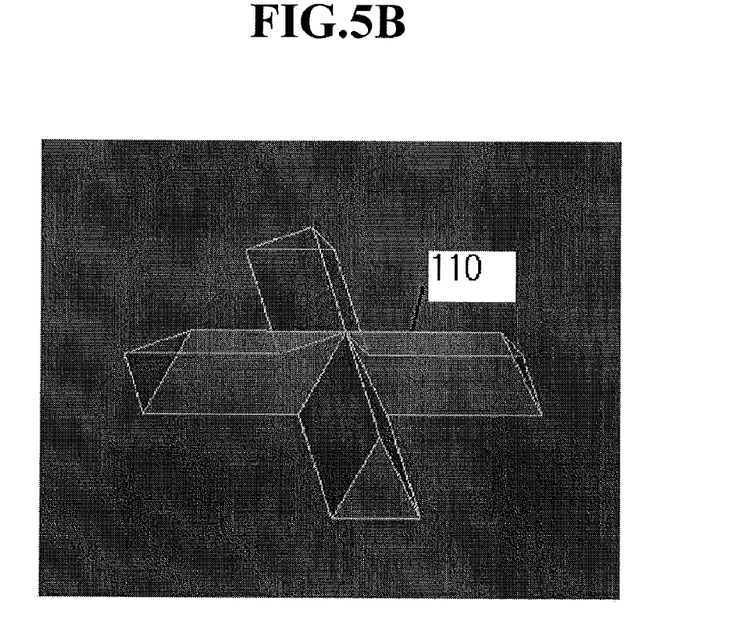

FIGS. 5A and 5B are respectively a plan view and a perspective view illustrating the prism pattern of the optical sheet according to an embodiment of the present invention.

As illustrated in FIGS. 5A and 5B, considering the prism pattern of the optical sheet according to the present invention in a stereoscopic view, the prism pattern has a cross shape rotated by an angle of 45°±5° with respect to the arrangement direction of the lamps. In other words, the single prism pattern consists of triangular columns extending in four directions from the center of the cross.

If it is assumed that a length of each triangular column extending outward from the center of the prism pattern is "b", a length of the base of a triangular side surface of the triangular column is "a", and an angle between the adjacent triangular columns is "c", these "a", "b" and "c" are present in the following range.

Specifically, if a value of b/a is in a range of 0.1~20, the angle "c" between the adjacent triangular columns is basically in a range of 90°±10°. Preferably, the angle "c" is 90°.

All the triangular columns may be designed to have the same value from the center of the cross, or both of the triangular columns facing each other may have the same value. As occasion demands, the four triangular columns may be designed to have different values. Experiments show that the best luminance and viewing angle characteristics are obtained when all the triangular columns are designed to have the same value from the center in consideration of symmetry.

The plurality of prism patterns, as illustrated in FIG. 3, may be arranged in rows, or may define a square array such as a mosaic shape, a triangular array such as a delta shape, or the like.

Hereinafter, experimental examples using different pitches of the prism patterns will be described.

Figure 6A:
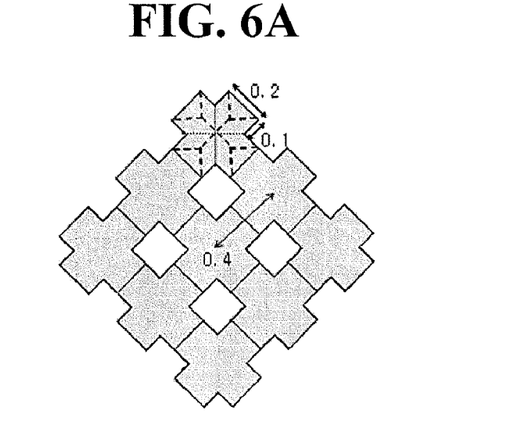
FIGS. 6A to 6C are plan views illustrating different prism patterns available in the optical sheet according to an embodiment of the present invention.
Figure 6B:
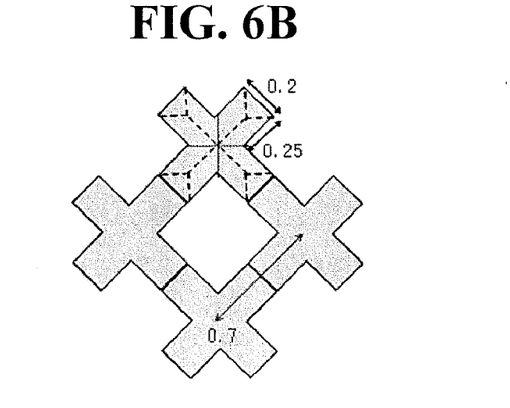
Figure 6C:
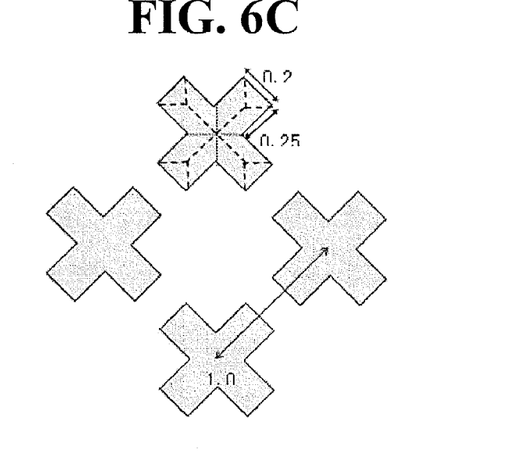
Figure 7A:
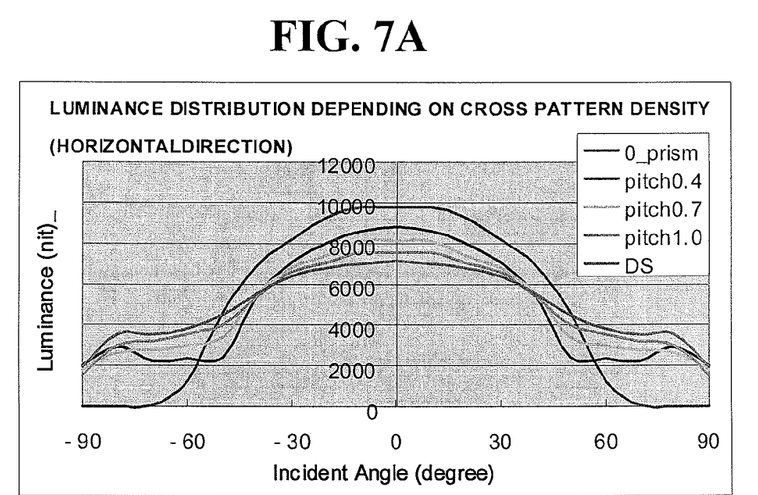
FIGS. 7A and 7B are graphs respectively illustrating luminance distribution in a horizontal direction and a vertical direction according to the density of the prism patterns of the optical sheet according to an embodiment of the present invention.
Figure 7B:
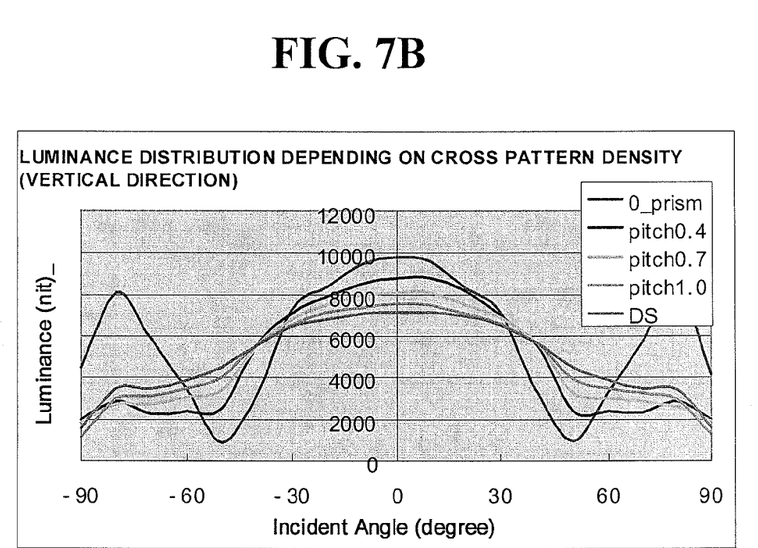

FIGS. 6A to 6C are plan views illustrating different prism patterns available in the optical sheet according to the present invention, and FIGS. 7A and 7B are graphs respectively illustrating luminance distribution in a horizontal direction and a vertical direction according to the density of the prism patterns of the optical sheet according to the present invention. Also, FIGS. 8A to 8E are simulation views illustrating a variation in viewing angle according to a variation in the pitch of the optical sheet according to the present invention.

In the optical sheet of the present invention, the pitch of the prism patterns refers to a distance between the centers of the adjacent prism patterns.

FIG. 6A illustrates a case in which the pitch is 0.4 mm. In this case, the base of the triangular side surface of each of the four triangular columns extending from the center of each prism pattern was set to 0.2 mm, and a length of each triangular column was set to 0.1 mm. Also, the adjacent prism patterns are arranged to come into contact with each other.

FIG. 6B illustrates a case in which the pitch is 0.7 mm. In this case, the base of the triangular side surface of each of the four triangular columns extending from the center of each prism pattern was set to 0.2 mm, and a length of each triangular column was set to 0.25 mm. Likewise, the adjacent prism patterns are arranged to come into contact with each other.

FIG. 6C illustrates a case in which the pitch is 1.0 mm. In this case, the base of the triangular side surface of each of the four triangular columns extending from the center of each prism pattern was set to 0.2 mm, and a length of each triangular column was set to 0.25 mm. In this case, although the individual prism pattern has the same shape as that of FIG. 6B, the pitch of the prism patterns increases such that the adjacent prism patterns are spaced apart from each other.

FIG. 7A illustrates luminance distribution in a horizontal direction according to the density of the prism patterns, and FIG. 7B illustrates luminance distribution in a vertical direction. It will be appreciated that the greater the density of the prism patterns, the greater the luminance at the front of the prism pattern and the smaller the half-power angle (i.e. an azimuth angle from which light having an intensity half the maximum intensity of light is emitted).

Figure 8A:
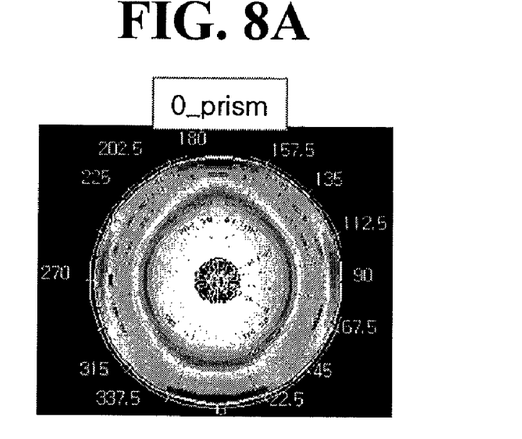
FIGS. 8A to 8E are simulation views illustrating a variation in viewing angle according to a variation in the pitch of the optical sheet according to an embodiment of the present invention.

In particular, as can be appreciated from FIG. 8A, a conventional horizontal prism pattern exhibits an enhanced luminance at the front side and a vertical direction thereof, but exhibits a remarkably deteriorated luminance in a horizontal direction thereof, thus having a considerable difference in viewing angle characteristics in different directions.

Figure 8B:
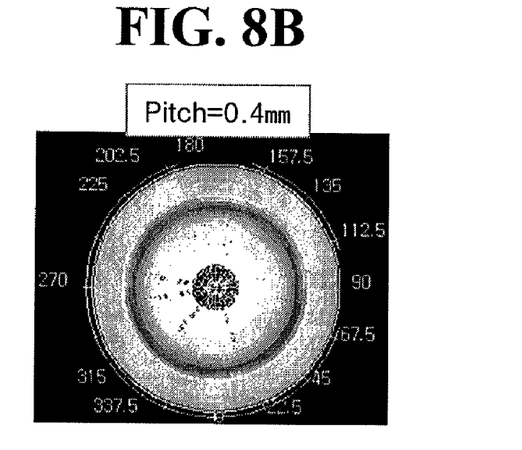
Figure 8C:
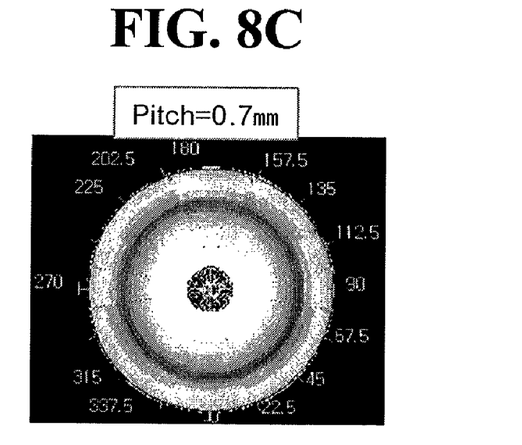
Figure 8D:
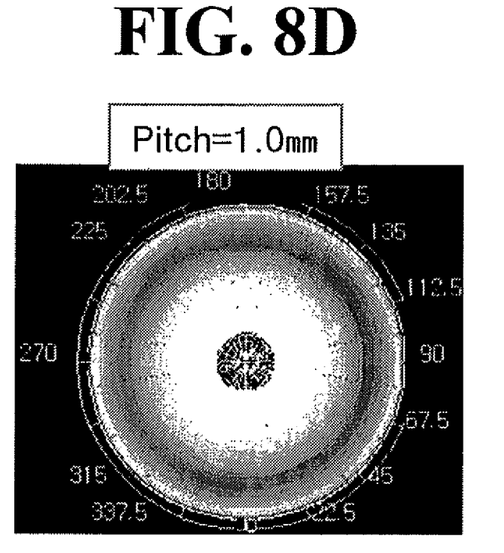
Figure 8E:
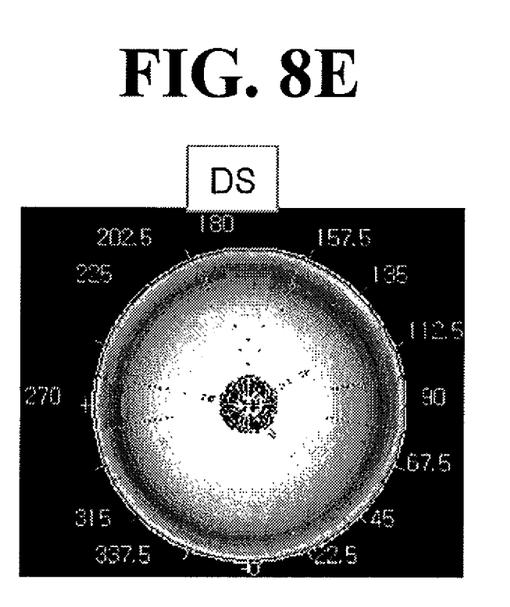

Also, as can be appreciated from FIG. 8E, double crossing prism sheets have deterioration in luminance efficiency as a whole.

In the case of FIG. 8B in which the prism patterns have a smaller pitch and higher density than the cases of FIGS. 8C and 8D, it can be appreciated that the luminance increases and the half-power angle decreases, resulting in the best optical characteristics.

In any case, it is preferable for achieving uniform optical effects that the prism patterns be arranged at the same pitch and that the respective prism patterns be arranged to come into contact with one another. In addition, judging from the view of the density, it can be appreciated according to the above described experimental results that the prism patterns having a high density are free from a difference in viewing angle characteristics when viewed from different directions.

FIGS. 9A to 9E are simulation views illustrating a variation in viewing angle according to a variation in the condensing axis angle of the prism pattern with respect to the arrangement direction of light sources.

Specifically, FIGS. 9A to 9E illustrate the cases in which a first axis is rotated in a range of about 35°~55° with respect to the arrangement direction of the lamps, such that crossing angles "A" and "B" between the first axis and a second axis are changed.

Figure 9A:
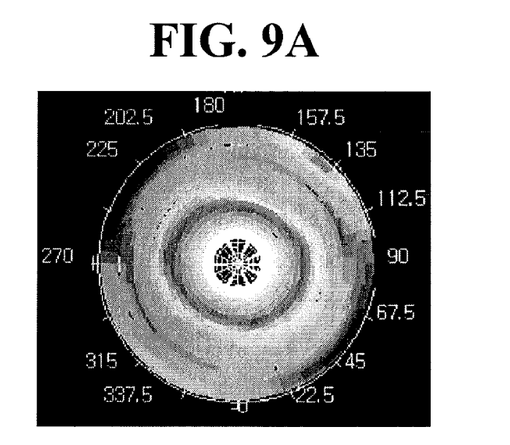
FIGS. 9A to 9E are simulation views illustrating a variation in viewing angle according to a variation in the condensing axis angle of the prism pattern with respect to an arrangement direction of light sources.

In FIG. 9A, the prism pattern is oriented such that the first axis and the second axis are rotated respectively by about 35° and about 145° with respect to the arrangement direction of the lamps, and the crossing angles "A" and "B" of the first axis and second axis are about 70° and about 110°.

Figure 9B:
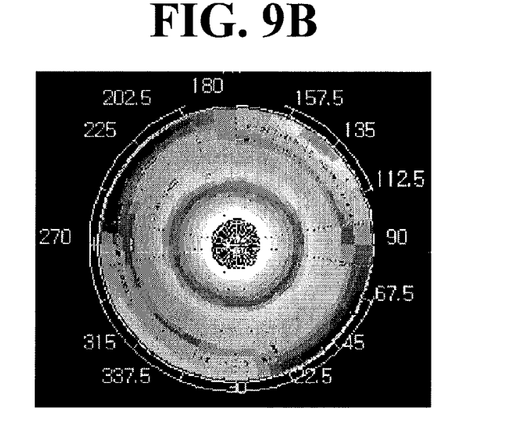

In FIG. 9B, the prism pattern is oriented such that the first axis and the second axis are rotated respectively by 40° and 140° with respect to the arrangement direction of the lamps, and the crossing angles "A" and "B" of the first axis and second axis are 80° and 100°.

Figure 9C:
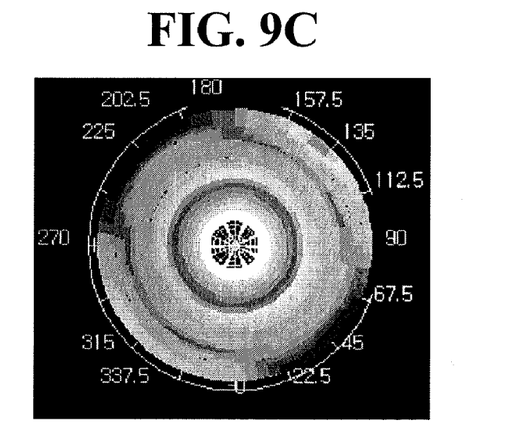

In FIG. 9C, the prism pattern is oriented such that the first axis and the second axis are rotated respectively by about 45° and about 135° with respect to the arrangement direction of the lamps, and the crossing angles "A" and "B" of the first axis and second axis are 90° and 90°.

Figure 9D:
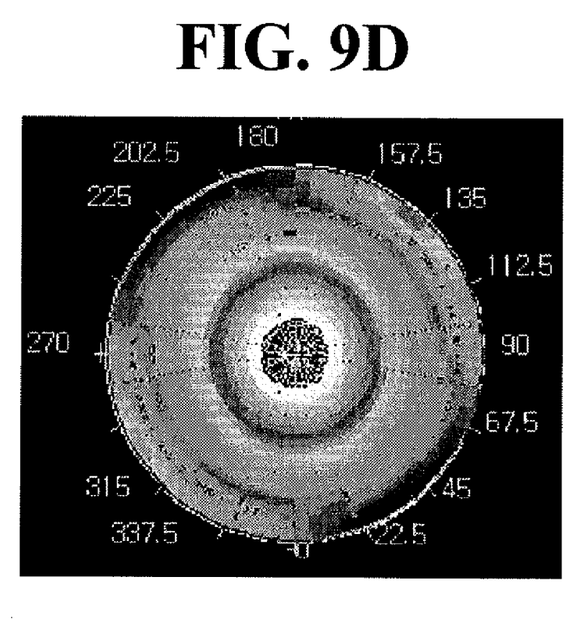

In FIG. 9D, the prism pattern is oriented such that the first axis and the second axis are rotated respectively by 50° and 130° with respect to the arrangement direction of the lamps, and the crossing angles "A" and "B" of the first axis and second axis are 100° and 80°.

Figure 9E:
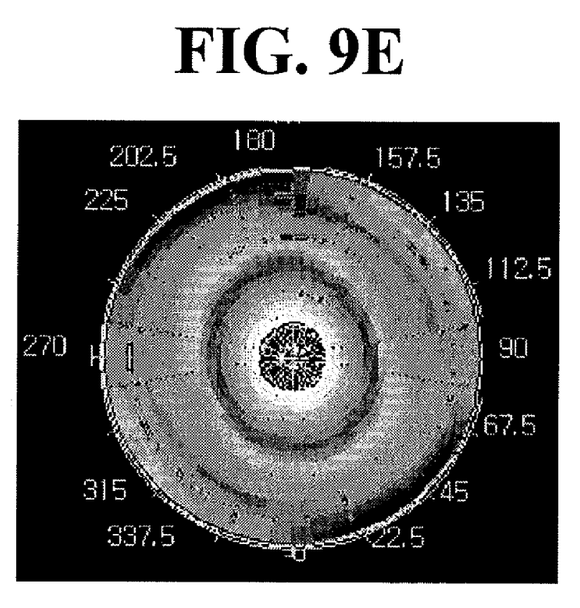

In FIG. 9E, the prism pattern is oriented such that the first axis and the second axis are rotated respectively by 55° and 125° with respect to the arrangement direction of the lamps, and the crossing angles "A" and "B" of the first axis and second axis are about 110° and about 70°.

FIG. 9C shows the most effective results. When the crossing angles "A" and "B" of the first axis and second axis are about 90° and the first axis is rotated by about 45° with respect to the arrangement direction of the lamps, the prism pattern exhibits the most superior optical characteristics. That is, the prism pattern having perfect symmetry in diagonal directions shows central circular viewing angle distribution and minimal side lobe in diagonal directions.

As compared to FIG. 9C, FIG. 9A shows vertically widened viewing angle distribution, i.e. vertically elongated elliptical viewing angle. That is, the smaller the crossing angle "A" (the greater the crossing angle "B"), luminance distribution, i.e. the half-power angle in a vertical direction increases, and the half-power angle in a horizontal direction decreases.

As compared to FIG. 9C, FIG. 9B shows vertically slightly widened viewing angle distribution, i.e. a vertically slightly longer elliptical viewing angle.

As compared to FIG. 9C, FIG. 9D shows horizontally slightly widened viewing angle distribution, i.e. a horizontally slightly longer elliptical viewing angle.

As compared to FIG. 9C, FIG. 9E shows horizontally widened viewing angle distribution, i.e. a horizontally elongated elliptical viewing angle.

As described above, it can be appreciated that as the crossing angle "A" increases (the smaller the crossing angle "B"), luminance distribution, i.e. the half-power angle in a horizontal direction increases, and the half-power angle in a vertical direction decreases.

Figure 10A:
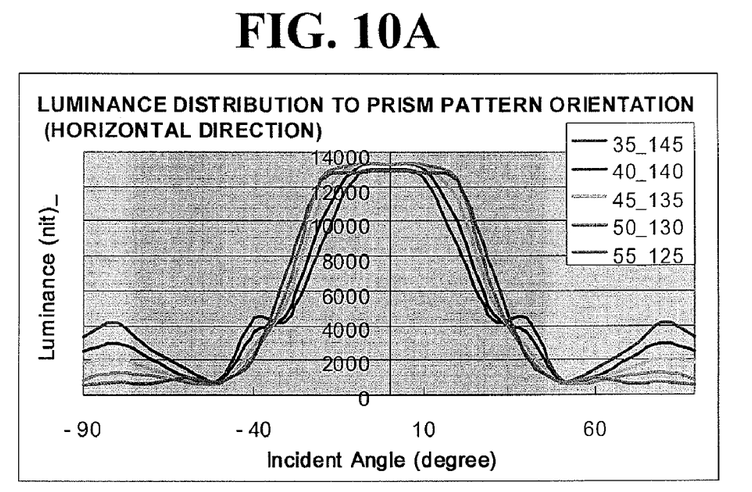
FIGS. 10A and 10B are graphs respectively illustrating luminance distribution in a horizontal direction and a vertical direction according to the orientation of the prism pattern of the optical sheet according to the present invention.
Figure 10B:
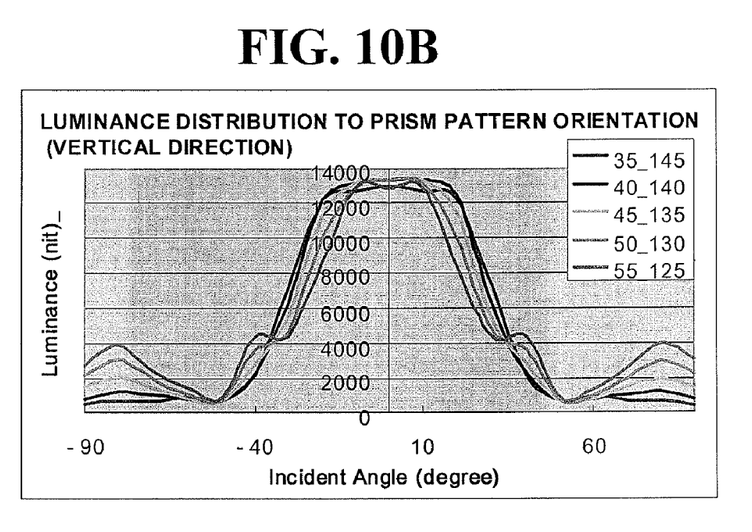

FIGS. 10A and 10B are graphs respectively illustrating luminance distribution in a horizontal direction and a vertical direction according to the orientation of the prism pattern of the optical sheet according to the present invention.

As can be appreciated from FIG. 10A, comparing the prism pattern of about 35°/145° to the prism pattern of about 55°/125°, as the crossing angle "A" increases and the crossing angle "B" decreases, luminance distribution, i.e. the half-power angle in a horizontal direction increase and side lobe decreases.

As can be appreciated from FIG. 10B, comparing the prism pattern of about 35°/145° to the prism pattern of about 55°/125°, as the crossing angle "A" increases and the crossing angle "B" decreases, luminance distribution, i.e. the half-power angle in a vertical direction decreases and side lobe decreases.

Accordingly, it can be appreciated that changing the diagonal condensing axis angle of the prism patterns increases a viewing angle only in a horizontal or vertical direction and decreases a viewing angle in the remaining direction and thus, is inappropriate to improve viewing angle characteristics. That is, it can be appreciated that the angle of the first axis and second axis of an optimal prism pattern is 90°.

As apparent from the above description, an optical sheet and a backlight unit using the same according to the present invention have the following effects.

The optical sheet includes prism patterns each having a first condensing axis extending diagonally, i.e. having an angle of about 35°~55° with respect to an arrangement direction (longitudinal direction) of light sources, and a second condensing axis crossing the first condensing axis. This configuration allows light to be concentrated on the center of the prism pattern rather than being biased in a vertical direction or a horizontal direction, thereby achieving enhanced luminous efficiency and contrast ratio while alleviating light leakage.

Further, differently from the related art in which a plurality of prism sheets have different condensing axes, according to the present invention, a single optical sheet is used, resulting in uniform condensing effects and a reduction in manufacturing costs thereof.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. An optical sheet comprising a plurality of crossed prism patterns each having a first condensing axis and a second condensing axis crossing each other in diagonal directions, with respect to an arrangement direction of a light source,
   wherein each of the crossed prism patterns comprises a combination of four triangular columns extending in opposite directions of the first condensing axis and in opposite directions of the second condensing axis around the center of the prism pattern and
   wherein: the first condensing axis has an angle of about 35°~about 55° with respect to the arrangement direction of the light source;
   the second condensing axis has an angle of about 125°~about 145° with resect to the arrangement direction of the light source; and
   an angle between the first condensing axis and the second axis is in a range of about 70°~about 110°.

2. The optical sheet according to claim 1, wherein the first condensing axis has an angle of about 45° with respect to the arrangement direction of the light source, the second condensing axis has an angle of about 135° with respect to the arrangement direction of the light source, and the angle between the first condensing axis and the second condensing axis is about 90°.

3. The optical sheet according to claim 1, wherein the crossed prism patterns are arranged at the same pitch.

4. The optical sheet according to claim 3, wherein the crossed prism patterns come into contact with one another.

5. A backlight unit comprising:
   a plurality of light sources arranged in a given direction;
   an optical sheet located above the light sources and including a plurality of crossed prism patterns each having a first condensing axis and a second condensing axis crossing each other in diagonal directions with respect to the arrangement direction of the light sources; and
   a case structure configured to surround the light sources,
   wherein each of the crossed prism patterns comprises a combination of four triangular columns extending in opposite directions of the first condensing axis and in opposite directions of the second condensing axis around the center of the prism pattern and
   wherein: the first condensing axis has an angle of about 35°~about 55° with reset to the arrangement direction of the light source;
   the second condensing axis has an angle of about 125°~about 145° with respect to the arrangement direction of the light source; and
   an angle between the first condensing axis and the second axis is in a range of about 70°~about 110°.

6. The backlight unit according to claim 5, wherein the first condensing axis of the optical sheet has an angle of about 45° with respect to the arrangement direction of the light sources, the second condensing axis has an angle of about 135° with respect to the arrangement direction of the light sources, and the angle between the first condensing axis and the second condensing axis is about 90°.

7. The backlight unit according to claim 6, wherein the crossed prism patterns are arranged at the same pitch, and come into contact with one another.

* * * * *